April 30, 1957 B. I. ULINSKI 2,790,879
CONTROL SWITCH MOUNTING FOR MOTORIZED HAND TRUCK
Filed Feb. 1, 1956 4 Sheets-Sheet 1
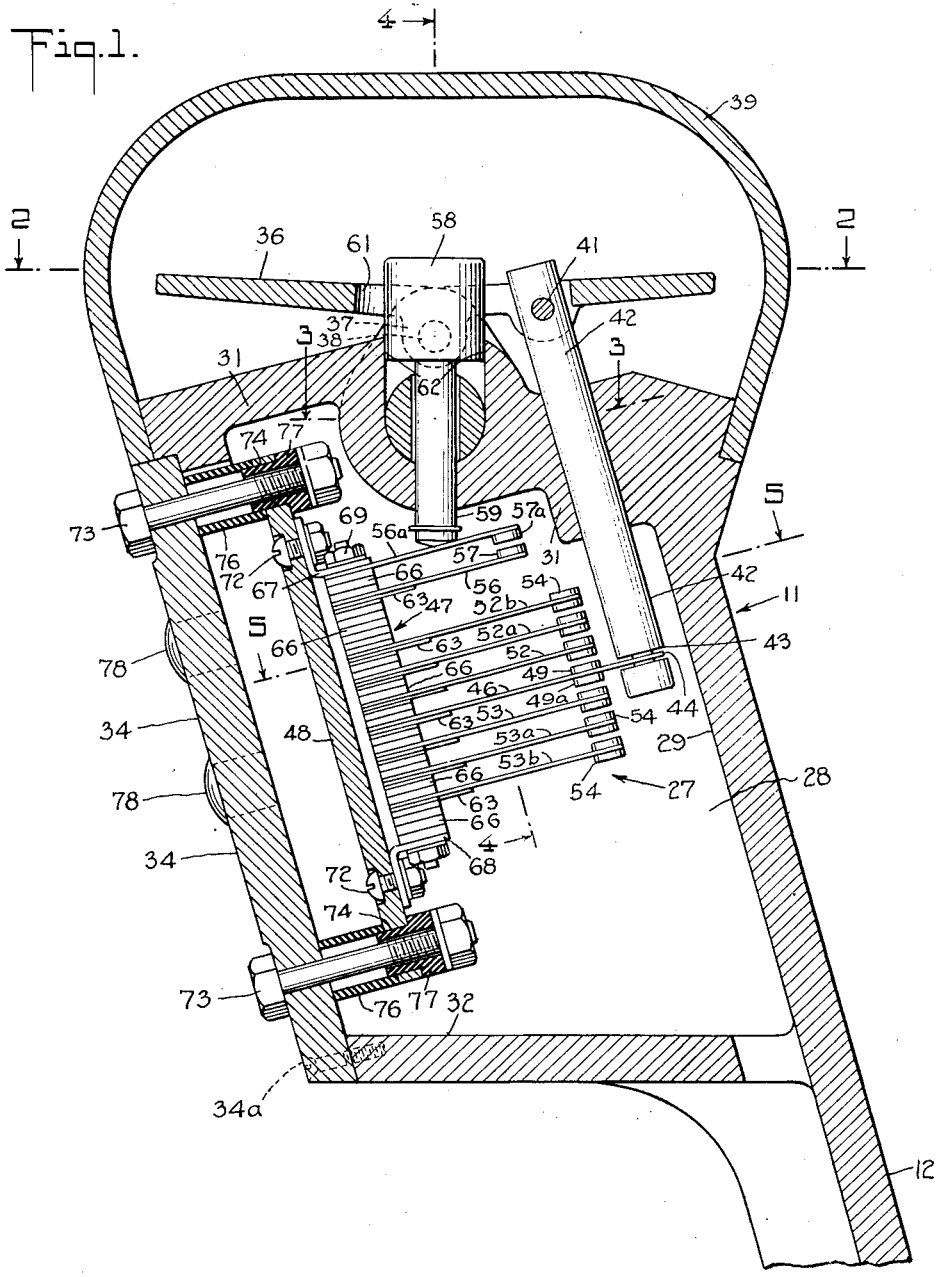
INVENTOR.
B. I. Ulinski
BY
ATTORNEY April 30, 1957 B. I. ULINSKI 2,790,879
CONTROL SWITCH MOUNTING FOR MOTORIZED HAND TRUCK
Filed Feb. 1, 1956 4 Sheets-Sheet 2
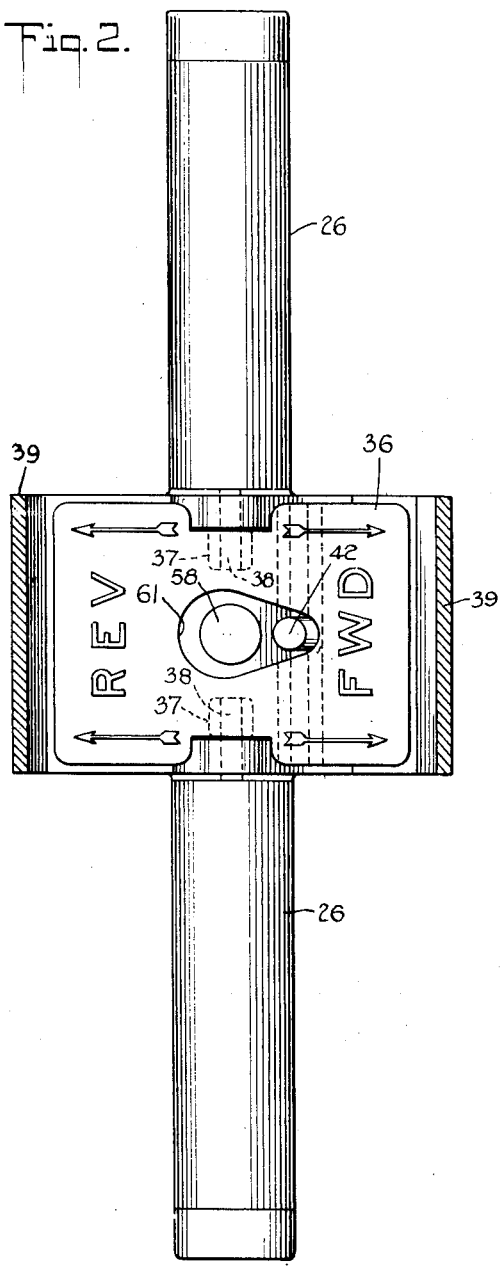
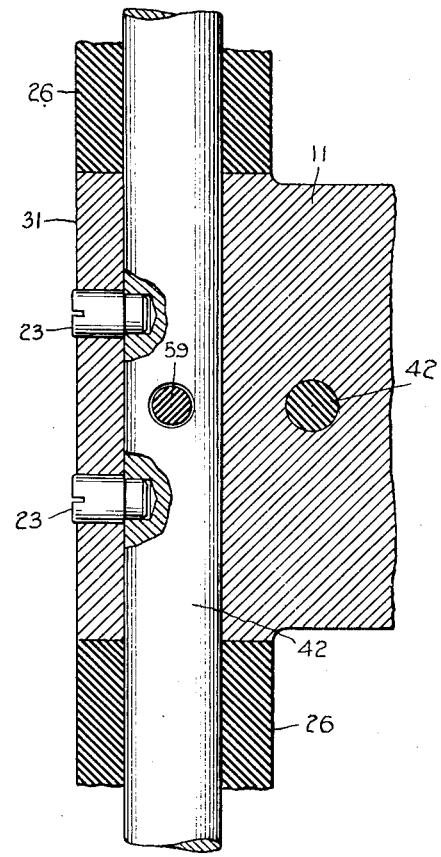
INVENTOR.
B. I. Ulinski
BY
A. H. Golden
ATTORNEY

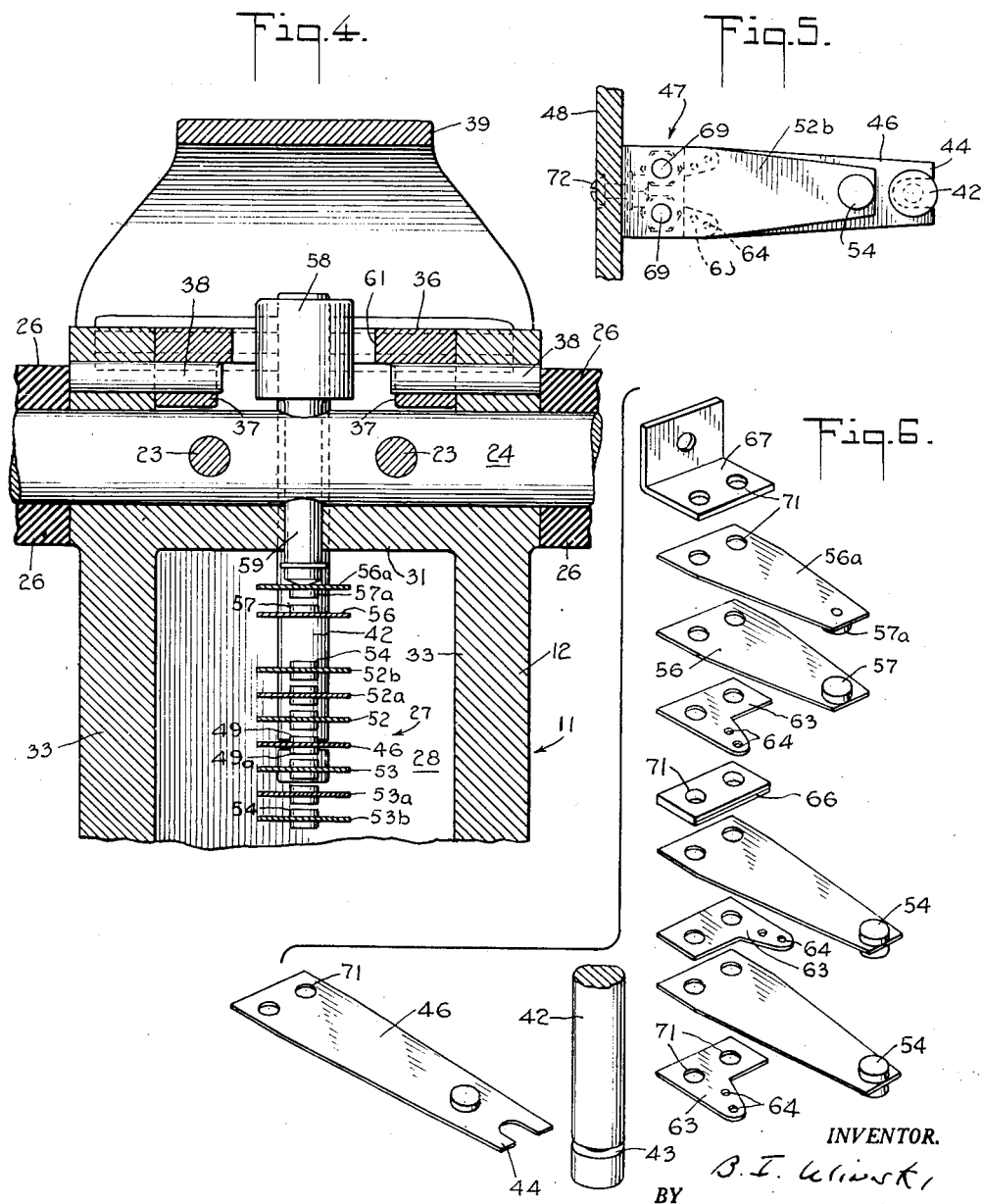

April 30, 1957 B. I. ULINSKI 2,790,879
CONTROL SWITCH MOUNTING FOR MOTORIZED HAND TRUCK
Filed Feb. 1, 1956 4 Sheets-Sheet 4

INVENTOR.
B. I. Ulinski
BY
A. H. Golden
ATTORNEY

United States Patent Office 2,790,879
Patented Apr. 30, 1957

2,790,879

CONTROL SWITCH MOUNTING FOR MOTORIZED HAND TRUCK

Bronislaus I. Ulinski, Flossmoor, Ill., assignor to The Yale & Towne Manufacturing Company, Stamford, Conn., a corporation of Connecticut Application February 1, 1956, Serial No. 562,709

8 Claims. (Cl. 200—157)

This invention relates to a truck of the class in which a traction unit comprising a motor, a gear case, and a traction and steering wheel, is mounted for rotation bodily relatively to the truck by a steering handle. The steering handle is pivoted to the traction unit for vertical swinging movement, and at the end of the handle there are mounted switches for controlling the operation of the traction unit and other operating parts of the truck.

As a feature of my invention, I contribute an extremely novel and unusual assembly for mounting the switches at the end of the handle so that they may be very readily controlled and varied in accordance with the operation desired. Those skilled in the art will appreciate that the mounting of the switches and other control means has always presented a very considerable problem, particularly when a variety of operations of the truck are required. Thus, it is not only necessary to propel the truck forwardly and rearwardly, but it is also necessary frequently to vary the speed of the truck, utilizing generally three speeds forward and three speeds rearward. In addition, it is important to have a horn for the truck, and other operating means such as may be required for the lifting apparatus of the truck, tilting apparatus, and other usual load handling means.

As a feature of my invention, I mount the switching structure on a plate or the like that may form the cover of a control casing at the operator's end of the handle, and I so arrange the parts that the mere application of this cover to the casing places the controls in position for operation by means carried at the operator's end of the handle.

As a more particular feature of my invention, I mount a finger piece at the end of the handle, the finger piece being movable and having operative connection with means extending into the casing at the end of the handle. When the cover of the casing carrying the switch means is applied to the casing, there is an automatic engagement between the finger piece operated means and the switch means carried by the casing cover so that thereafter the operation of the finger piece will be effective to move the switch means carried by the cover for controlling the operation of the truck.

As a more particular feature of this part of the invention, the end of the handle may even carry a horn button, the mounting of the casing cover placing in the path of means operated by the horn button switching means that will actuate the horn. Those skilled in the art will readily appreciate that merely by wiring the cover in a particular manner, it is possible then to assemble the cover to the handle and automatically place the horn-actuating electric switch means in position for actuation thereafter.

As even a more particular feature of my invention, the finger piece is adapted for movement in one direction to place the truck motor in reverse and in the opposed direction to place the truck motor in forward drive. The connection between the switch means carried by the casing cover and the finger piece actuated means is such that the movement of the finger piece in opposed directions will move the switch means in opposed directions.

As a further particular feature of the invention, a central means is provided in the switch for actuation by the finger piece, this central means closing a series of circuits for first, second and third speed drives in opposed directions when moved in either of opposed directions by the finger piece.

As a further particular feature of the invention, the switch cover may be formed with knock out pieces into which may be placed push buttons or the like for controlling various circuits of the truck for tilting the load, lifting the load, shifting the load, etc., as those skilled in the art will fully appreciate.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

In the accompanying drawings, which illustrate one embodiment of this invention:

Fig. 1 is a cross-sectional view in elevation of the end of the steering handle of a lift truck, showing the mounting and assembly of the switches and the means for actuating the switches.

Fig. 2 is a plan view in cross-section taken along the line 2—2 of Fig. 1.

Fig. 3 is a cross-sectional view taken along the line 3—3 of Fig. 1.

Fig. 4 is a view taken along the line 4—4 of Fig. 1.

Fig. 5 is a view of a portion of the switch assembly taken along the line 5—5 of Fig. 1.

Fig. 6 is an exploded view showing portions of the switch assembly.

Figure 7:
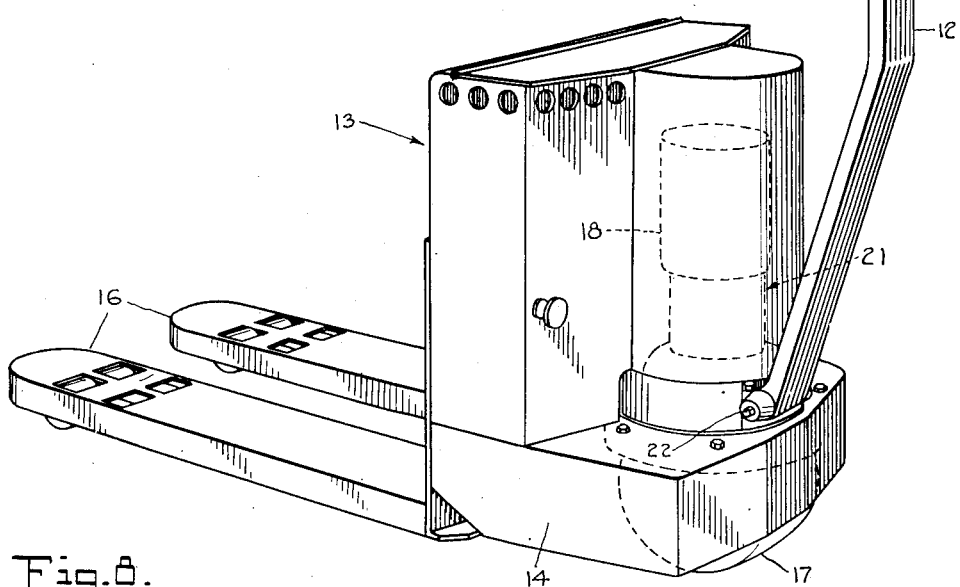
Fig. 7 is a perspective view of a lift truck on which the steering handle of Fig. 1 is mounted.
Figure 8:
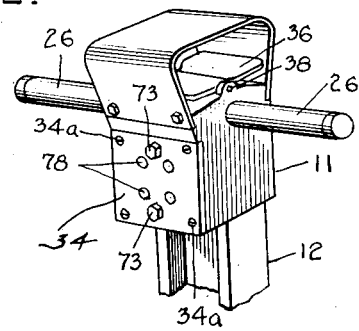
Fig. 8 is a perspective enlarged view of the upper end of the steering handle showing the construction of the switch casing.

Referring now to the drawings, and particularly to Figs. 7 and 8, reference numeral 11 designates generally a long steering handle 12 of a lift truck 13 having a lifting head 14 and an elevating platform 16. The lift truck 13 is of the well known type in which a ground-engaging traction wheel 17, a motor 18, and the gearing 19 connecting said motor and said traction wheel are all mounted together as a single traction unit 21. This traction unit 21 is rotatable relatively to the lifting head 14 of the truck about a vertical axis, steering of the truck being accomplished by such rotation of the traction unit through manual operation of the long steering handle 12 attached to said traction unit.

For convenience in operation, the handle 12 is pivoted for movement in a vertical plane about a horizontal pivot 22 on the traction unit. Fixed at the end 11 of the steering handle 12 by means of screws 23 (Figs. 3 and 4), and extending through said handle is a round bar 24, the projecting ends of which are covered by sleeves 26 of suitable soft material, such as rubber or leather, adapted to be grasped by the hands of the operator of the truck.

Control of the speed of the traction wheel 17, in both the forward and the reverse directions, is effected by means of switches indicated generally as 27 mounted in a casing 28 disposed at the upper end 11 of the steering handle 12. The front wall 29, top wall 31, bottom wall 32 and parallel side walls 33 (Fig. 4) of the casing 28 are integral with the steering handle 12 and the casing is closed by a cover 34 (best seen in Fig. 8) on which the switches 27 are mounted in a manner described more fully below.

Movement of the switches 27 is effected by manipulation of a control lever in the form of a plate 36 disposed above the top wall 31 of the casing 28 and having symmetrically arranged depending ears 37 journalled on spaced aligned pins 38 mounted on the steering handle 11. It will be seen that this plate 36 is so located that when the operator of the truck grasps the sleeves 26 with his hands he may move the plate 36 with the fingers of either hand. A curved strip 39 mounted at the end of the handle serves as a guard to prevent accidental movement of the plate and to protect the fingers of the operator. Pivoted to the plate 36, by means of a pin 41, is a plunger 42 which extends into the casing 28 and is slidably disposed in an aperture in the top wall 31 of said casing. The lower end of the plunger 42 is grooved at 43 to receive the forked or slotted end 44 of a central long resilient electrically conductive metal leaf or finger 46 extending from a switch-mounting assembly 47 supported on a panel 48, the panel 48 being in turn fixed to the cover 34 by insulated mounting means to be described in detail below.

The central leaf or finger 46 carries on opposite sides thereof and in electrically conductive relationship therewith a pair of contact points 49, 49a disposed a short distance from the forked end 44 of said finger. Extending from the switch-mounting assembly 47 above and below the long central finger 46 are two series of slightly shorter resilient electrically conductive metal leaves or fingers 52, 52a, 52b, 53, 53a, 53b each finger having a pair of oppositely disposed contact points 54 at the end thereof. All of the contact points 54 are aligned with the contact points 49, 49a of the central finger 46, so that when the central finger is moved upwards it will make electrical contact successively with the fingers 52, 52a, 52b and when it is moved downward it will make electrical contact successively with the fingers 53, 53a, 53b.

Also extending from the switch-mounting assembly 47, above the finger 52b, are a pair of shorter resilient electrically conductive metal leaves or fingers 56, 56a having opposing single contacts 57, 57a at their ends. These shorter fingers 56, 56a are adapted to be brought into electrical contact with each other by manual depression of a push button 58 which is mounted, outside of the casing 28 at the end of a plunger 59 passing through the top wall 31 and through a hole in the bar 24 and engaging the upper finger 56a. In order to provide access to the push button 58 the plate-like control lever 36 has a central opening 61 through which the push button 58 extends, and which is of such size that the control lever may be pivoted freely without interference by the push button. The push button 58 is kept from rocking by engagement thereof with shoulders 62 projecting from the top wall 31 and by the engagement of the plunger 59 with said top wall. The push button 58 is resiliently urged to its normal raised position by the action of the upper finger 56a.

The switch-mounting assembly 47 comprises the bases of the fingers 46, 52, 52a, 52b, 53, 53a, 53b, 56, 56a, as well as a plurality of sheet metal connector members 63 (see Figs. 1 and 6), each connector being in electrical contact with the base of a single finger and each connector being provided with a pair of holes 64 for receiving the end of an insulated connecting wire (not shown). Insulating spacers 66 are disposed between the resilient fingers and the whole assembly of fingers, connectors and spacers is supported on a pair of brackets 67, 68 and is held together by a pair of bolts 69 passing through aligned holes 71 in the aforesaid elements of the assembly. The brackets 67, 68 are fixed to the panel 48 by means of bolts 72, while the panel 48 is mounted on the cover 34, in a position parallel to said cover, by large bolts 73 passing through holes 74 at the ends of said panel. Sleeves 76 of insulating material, disposed around the bolts 73, serve to space the panel 48 from the cover 34, while the bolts 73 are insulated from the panel 48 by means of inserts 77 fitting in the holes 74.

As seen best in Fig. 8, as well as Fig. 1, the cover 34 is secured to the casing 28 by screws 34a extending into lower wall 32 and upper wall 31. It will be seen that removal of the cover 34 from the casing disengages the central finger 46 from the plunger 42 and also disengages the upper finger 56a from the push button plunger 59 while application of the cover to the casing brings the central finger into locking engagement with the groove 43 in the plunger 42 and also brings the upper finger 56a into contact with the push button plunger 59. When the central finger 46 and plunger 42 are locked together the resilience of the central finger serves to urge this plunger and attached control lever 36, to a neutral position, i. e. a position where all of the fingers 46, 52, 52a, 52b, 53, 53a, 53b are out of contact with each other.

In one convenient embodiment, such as the one illustrated in the drawings, the wires (not shown) leading to the bases of the various fingers 46, 52, 52a, 52b, 53, 53a, 53b are so connected that manipulation of the control lever 36 in one direction causes the track 13 to move forward first at a slow speed when only the fingers 46 and 53 are in electrical contact, and then, as more contact fingers are successively brought together by further movement of the lever 36, at successively increasing speeds. Manipulation of the lever 36 in the opposite direction effects rearward movement of the truck at corresponding successively increasing speeds. Depression of the push button 58 closes the contacts 57, 57a and thus causes the horn of the truck to blow. It will be understood however, that other wiring arrangements may be made and that the construction of this invention lends itself readily to easy interchange of wiring, by the substitution of one panel 48 and switch-mounting assembly 47 for another on the cover 34. Also, as a further feature, the cover 34 may be formed with knock out pieces 78 in place of which controlling elements such as push buttons may be inserted so as to control various circuits of the truck 13 for any desired movements of the elevating platform 16 of the truck.

I now claim:

1. In a truck of the class described, a steering handle, a casing at the operator's end of the handle, an actuator mounted for to and fro movement in said casing, a movable cover for said casing, a finger fixed to and supported by said cover and having a free end adapted to be moved in opposed directions, electrical contacts mounted on said cover for movement into contact when the free end of the finger is moved, means formed on the free end of said finger for engaging means on the actuator to lock the finger to the actuator for movement therewith in opposed directions, said locking means being formed so as to be brought into effective engagement by the application of said cover to said casing.

2. In a truck of the class described, a steering handle, a casing at the operator's end of the handle, an actuator mounted for to and fro movement in said casing, a movable cover for said casing, a long resilient electrical contact finger fixed to and supported by said cover and having a free end adapted to be moved in opposed directions, other resilient electrical contact fingers disposed on opposite sides of said long finger and spaced from the normal position of said long finger for selective engagement with said long finger on movement of the free end of the long finger in opposed directions, means formed on the free end of said long finger for engaging means on the actuator to lock the finger to the actuator for movement therewith in opposed directions, said locking means being formed so as to be brought into effective engagement by the application of said cover to said casing.

3. In a truck of the class described, a steering handle, a casing at the operator's end of the handle, a reciprocable plunger extending into said casing, a removable cover for said casing, a long resilient electrical contact finger fixed to and supported by said cover and having a free end adapted to be moved in opposed directions, a series of spaced other electrical contact fingers at each side of said long finger mounted for sequential movement by said finger into contact with one another when the free end of the long finger is moved, means formed on the free end of said long finger for engaging means on the plunger to lock the finger to the actuator for movement therewith in opposed directions, said locking means being formed so as to be brought into effective engagement by the application of said cover to said casing, the resilience of said long finger acting to maintain said long finger and plunger in a normal position to maintain said other fingers out of contact with each other.

4. In a truck of the class described, a steering handle, a casing at the operator's end of the handle, a reciprocable plunger extending into said casing, a removable cover for said casing, a finger fixed to and supported by said cover and having a free end adapted to be moved in opposed directions, electrical contacts mounted on said cover for movement into contact when the free end of the finger is moved, the free end of said finger being slotted for receiving a portion of said plunger and said plunger having a groove to receive the free end of said finger to lock the finger to the plunger for movement therewith in opposed directions, said locking means being formed so as to be brought into effective engagement by the application of said cover to said casing.

5. In a truck of the class described, a steering handle, a casing at the operator's end of the handle, an actuator mounted for to and fro movement in said casing, a lever pivoted on said casing for manipulation by the hands of the operator of the truck, means securing said actuator to said lever for movement by said lever, a cover for said casing, a finger fixed to and supported by said cover and having a free end adapted to be moved in opposed directions, electrical contacts mounted on said cover for movement into contact when the free end of the finger is moved, means formed on the free end of said finger for engaging means on the actuator to lock the finger to the actuator for movement therewith in opposed directions, said locking means being formed so as to be brought into effective engagement by the application of said cover to said casing.

6. In a truck of the class described, a steering handle, a casing at the operator's end of the handle, an actuator mounted for to and fro movement in said casing, a lever pivoted on said casing for manipulation by the hands of the operator of the truck, means securing said actuator to said lever for movement by said lever, a cover for said casing, a finger fixed to and supported by said cover and having a free end adapted to be moved in opposed directions, electrical contacts mounted on said cover for movement into contact when the free end of the finger is moved, means formed on the free end of said finger for engaging means on the actuator to lock the finger to the actuator for movement therewith in opposed directions, said locking means being formed so as to be brought into effective engagement by the application of said cover to said casing, said lever having an opening therein, a push button mounted on said casing and extending through said opening and said casing, said opening being of such size and said push button being so positioned that the pivotal movement of said lever is free of said push button, and additional contacts on said cover positioned adjacent to said push button for operation thereby.

7. In a truck of the class described, a steering and lifting handle, a casing at the operator's end of the handle, contacts mounted for movement in said casing, a finger operated lever pivoted on said casing, means whereby said lever actuates said contacts, said lever having an opening therein, a push button mounted on said casing and extending through said opening, said opening being of such size and said push button being so positioned that the pivotal movement of said finger operated lever is free of said push button, and additional contacts on said casing positioned under said push button for operation thereby.

8. In a truck of the class described, a steering handle, a casing at the operator's end of the handle, a reciprocable plunger extending into said casing, a lever pivoted on said casing for manipulation by the hands of the operator of the truck, a pivot pin joining said plunger to said lever for movement by said lever, a movable cover for said casing, a long resilient electrical contact finger having its base fixed to and supported by said cover and having a free end adapted to be moved in opposed directions, a series of spaced other resilient electrical contact fingers at each side of said long finger, said other fingers having their bases fixed to and supported by said cover and having their free ends positioned for sequential movement by the free end of said long finger first into contact with said long finger and then, on further movement of said long finger, into contact with one another, additional contact fingers having their bases fixed to and supported by said cover, said lever having an opening therein, a push button mounted on said casing and extending through said opening and said casing, said opening being of such size and said push button being so positioned that the pivotal movement of said lever is free of said push button, an extension of said push button disposed in said casing and adapted to engage one of said additional contact fingers, means at the free end of said long finger for interfitting with complementary means on said plunger to lock the free end of said long finger to the plunger for movement therewith in opposed directions, said interfitting means being formed so as to be brought into effective engagement by the application of said cover to said casing, the construction and arrangement of said cover being such that application of said cover to said casing brings said one of said additional contact fingers into position for engagement by said push button extension.

No references cited.